United States Patent
Yang et al.

(10) Patent No.: US 12,474,474 B2
(45) Date of Patent: Nov. 18, 2025

(54) COLLABORATIVE PHASE-SHIFT LASER RANGING DEVICE BASED ON DIFFERENTIAL MODULATION AND DEMODULATION OF COARSE AND PRECISE MEASURING WAVELENGTH AND RANGING METHOD THEREOF

(71) Applicant: Harbin Institute of Technology, Heilongjiang (CN)

(72) Inventors: Hongxing Yang, Heilongjiang (CN); Jing Li, Heilongjiang (CN); Pengcheng Hu, Heilongjiang (CN); Xu Xing, Heilongjiang (CN); Jiubin Tan, Heilongjiang (CN)

(*) Notice: Subject to any disclaimer, the term of this patent is extended or adjusted under 35 U.S.C. 154(b) by 902 days.

(21) Appl. No.: 17/711,026

(22) Filed: Apr. 1, 2022

(65) Prior Publication Data
US 2023/0050363 A1 Feb. 16, 2023

(30) Foreign Application Priority Data
Aug. 12, 2021 (CN) .......................... 202110925288.3

(51) Int. Cl.
  *G01S 17/36* (2006.01)
  *G01S 7/4912* (2020.01)
(52) U.S. Cl.
  CPC ............ *G01S 17/36* (2013.01); *G01S 7/4916* (2013.01)
(58) Field of Classification Search
  CPC .................................. G01S 17/34; G01S 17/36
  See application file for complete search history.

(56) References Cited

U.S. PATENT DOCUMENTS 5,082,364 A * 1/1992 Russell ................ G01S 7/4917
356/5.15

FOREIGN PATENT DOCUMENTS

| CN | 1825138 A | 8/2006 |
|----|-----------|--------|
| CN | 101349757 A | 1/2009 |
| CN | 202351429 U | 7/2012 |
| CN | 102928832 A | 2/2013 |
| CN | 104049248 A | 9/2014 |
| CN | 108120378 A | 6/2018 |

* cited by examiner

*Primary Examiner* — Thanh Luu
(74) *Attorney, Agent, or Firm* — Addison D. Ault; IPGentleman Intellectual Property Services, LLC

(57) ABSTRACT

The present disclosure relates to a collaborative phase-shift laser ranging device based on differential modulation and demodulation of coarse and precise measuring wavelength and a ranging method thereof. A collaboration terminal is disposed at a target to be measured of a phase-shift laser ranging system, which can improve the intensity of measurement light and then irradiate the same back to a measuring terminal, thereby resolving the problem of low ranging accuracy caused by the attenuation of light intensity during long-distance ranging. The collaboration terminal detects coarseness gauge signals and modulates a laser source by means of differential modulation; the collaboration terminal detects precision gauge signals by means of difference frequency demodulation, and then the intensity of measurement light is improved by mixing and restoring the precision gauge signals and modulating the collaboration-terminal laser source.

6 Claims, 3 Drawing Sheets

COLLABORATIVE PHASE-SHIFT LASER RANGING DEVICE BASED ON DIFFERENTIAL MODULATION AND DEMODULATION OF COARSE AND PRECISE MEASURING WAVELENGTH AND RANGING METHOD THEREOF

CROSS REFERENCE TO RELATED APPLICATION

This patent application claims the benefit and priority of Chinese Patent Application No. 202110925288.3, filed on Aug. 12, 2021, the disclosure of which is incorporated by reference herein in its entirety as part of the present application.

TECHNICAL FIELD

The present disclosure relates to the technical field of laser measurement of absolute distance, in particular to a collaborative phase-shift laser ranging device based on differential modulation and demodulation of coarse and precise measuring wavelength and a ranging method thereof.

BACKGROUND ART

Laser ranging technology, with its high measuring precision, strong anti-interference ability, high temporal and spatial resolution, as well as high vertical resolution, etc., has been widely used in manufacturing of large-sized equipment, deep space navigation of spacecrafts, rendezvous and docking, and distributed satellite formation, and other fields, making itself an indispensable part in the research of aerospace, major scientific installations and national economic development. With the development of science and technology, especially the rapid advancement of aerospace technology, a higher demand has been placed on the measurement range, measurement accuracy and stability of measurement technology. In recent years, aiming at the research task of space physics exploration, the cooperative detection of complex physical processes in space with small satellite formation flying has become a research hotspot. For example, among formation satellites such as the GRACE-FO satellite from NASA, NMP ST-5 Program, Proba-3 satellite from European Space Agency (ESA), and Germany's Gemini satellite, the spacing between minisatellites ranges from several hundred meters to tens of kilometers. In addition, it is required that the distance measurement accuracy thereof reach the order of millimeters, submillimeters or even tens of microns. In the study of gravitational wave detection in space, the maximum arm length difference caused by intersatellite orbit dissociation reaches 30,0000 km respectively, and for the purpose of correctly capturing gravitational wave signals, the absolute distance measurement accuracy of arm length needs to reach 30 cm. The processing and overall assembly of large-sized components is further making higher demands on ranging technology. Take large and ultra-large single radiotelescopes as an example, in order to ensure the detection sensitivity and imaging accuracy of celestial bodies and interstellar molecules, it is necessary to carry out real-time measurement and overall control on the reflector aperture with a length of several hundred meters to several thousand meters, and each reflector needs to reach the measurement accuracy of greater than several millimeters or even several hundred microns. It can be seen that with the enlargement of the scope of space exploration and the higher demand for detection accuracy, there is an urgent need for ranging technology that takes ultra-long operating distance, accuracy of precision measurement and high real-time performance into full account in the future, so as to achieve submillimeter-grade or even micron-grade accurate measurement of the target within the range of several hundred meters to several hundred thousand kilometers.

However, existing ultra-precision measurement methods, such as laser interference ranging, and ultra-long-span measurement methods, such as differential GPS ranging, pseudo-random code modulation ranging, pulsed laser ranging, visible light vision measurement, as well as electro-optic modulation based optical frequency comb absolute ranging, all impede the performance improvement in principle or technology. For example, the pseudo-random code modulation-based ranging method proposed by the patent [Long-distance laser ranging system based on high-speed pseudo-random code modulation and photon counting, publication number: CN102928832A] is similar to the pulsed laser ranging method, both of which are based on pulse time. Due to the influence of principle error and device noise, its centimeter-grade measurement accuracy has been close to the technical limit. The optical frequency comb absolute ranging method proposed by the patent [Sinusoidal phase modulation interferometry-based absolute ranging device and method based on femtosecond optical frequency comb, publication number: CN108120378A] has high measurement accuracy, but can hardly be applied to measurement distance ranging from several hundred kilometers to several hundred thousand kilometers due to the limitation of coherent length.

Regarding the multi-wavelength modulation phase-shift laser ranging method and device proposed by the patent [Wide-range, high-precision and rapid laser ranging method and device based on multi-frequency synchronous modulation, publication number: CN1825138A], the phase difference between modulated light emitted by the measuring terminal and modulated light reflected by the measured target is utilized to measure the absolute distance between the two. Since the phase difference can only lie between 0~2π, the measuring length cannot exceed ½ of the wavelength. In order to ensure the ranging accuracy and measurement range, wavelengths of multiple gauges covering coarseness gauges and precision gauges produced by modulation are used for graded measurement and graded optimization. Among them, the coarse gauges and precise gauges are used to meet the measurement range and the measurement accuracy, respectively, while the rest are used as transition gauges to engage coarse and precise measuring wavelength. In theory, it is possible to achieve submillimeter-grade or even micron-grade accurate measurement on the target within the range of several hundred meters to several hundred thousand kilometers. However, in the long-distance multi-wavelength modulation phase-shift laser ranging, the measurement light will travel back and forth between the measuring terminal and the target terminal. Given the divergence of light beams in the process of propagation, the return power thereof will attenuate sharply with the biquadratic function of the measured distance, followed by low signal-to-noise ratio of the measurement signal, which has become important factors limiting the long-distance measurement of phase-shift laser ranging. Due to the limitations of the performance of the photodetectors, the load of the measured object and the laser safety, it is difficult to increase the return energy of the system by increasing the laser power and increasing the aperture of a collaboration target.

In the patent [Phase-shift laser ranging method and device based on active collaboration, publication number: CN101349757A], an internally modulated active ranging collaboration terminal based on current modulation is put forward. At collaboration by detecting measurement laser, the modulation signal is obtained and amplified, and a laser source of the collaboration terminal is modulated by the modulation signal and irradiated back to the measuring terminal, such that the active collaboration target terminal device and the measuring terminal device work together to complete distance measurement. In this way, the attenuation of the return laser energy of the measuring system is shifted from the form of biquadratic attenuation function of the measured distance to the form of quadratic attenuation function, which increases the return laser energy and signal-to-noise ratio, and hence brings about a remarkable effect during long-distance measurement. However, in order to meet the requirement for the micron-grade ranging precision within the measurement range of more than several hundred kilometers, the wavelength of a coarseness gauge should be greater than 200 km, and correspondingly, the frequency of the same should be lower than 1.5 KHz. In the case where the phase detection accuracy is 0.08°, to achieve the measurement accuracy of 1 μm, the required synthetic wavelength of the precision gauge is 9 mm, and correspondingly, the frequency of the same is 33.3 GHz. As a result, the modulation bandwidth of the laser should at least cover 1.5 KHz to 33.3 GHz. Limited by lasing effect of the laser source and circuit parameters, current modulation adopted in the patented ranging method has the disadvantages of narrow modulation bandwidth, low frequency of the precision gauge, large bias current required, high working temperature, and unstable output light power, which further affects the accuracy and stability of the precision measurement results. Therefore, this method could hardly meet the requirements for large-scale and high-precision absolute distance measurement.

In the patent [Laser phase ranging device, publication number: CN202351429U], electro-optical modulators are used to produce gauge signals with a frequency above 1 GHz. However, such high-bandwidth electro-optical modulators (above 10 G) may, under the influence of radio frequency line impedance and radio frequency joule effect, change the physical properties of electrodes and waveguides, which further leads to a poor effect of low-frequency modulation, and the failure to the application in modulation of signals with low frequency of 1 MHz or below while the accuracy is guaranteed. Therefore, existing modulation methods cannot meet the ultra-wide modulation range from tens of Hz to tens of GHz, which refrains collaborative phase-shift laser ranging methods from being applied to micron-grade high-precision measurement within an ultra-long distance range. It is necessary to further study a laser modulation method supporting high bandwidth, that is, a gauge generation mode, which is especially intended for overcoming the undesirability of low-frequency signal modulation, and expanding the measurement range.

Secondly, for the collaborative phase-shift laser ranging technology, photoelectric detectors are required to convert coarse and precise measuring wavelength into electric signals for subsequent signal processing and phase detection. However, existing photoelectric detectors cannot effectively or even directly detect gauge signals up to tens of GHz or even hundreds of GHz. The patent [Combined superheterodyne and heterodyne anti-aliasing laser ranging device and method, publication number: CN104049248A] adopts the photoelectric detection method integrating heterodyne and superheterodyne modes, which obtains a precise phase measurement result by detecting superheterodyne signals, so as avoid direct detection of precision gauge signals of tens to hundreds of GHz. However, since the optical path of measurement light is different from that of reference light, when the optical path difference therebetween is greater than the coherent length, the interference signal-to-noise ratio decreases, making it difficult to conduct phase extraction. Therefore, under the limitation of the coherent length, this method can only achieve measurement at the grade of thousands of meters while ensuring high-precision measurement.

In order to break the limitation to phase-shift laser ranging technology caused by the sharp attenuation in return energy of measurement laser during long-distance reciprocation, and meet the requirements for large-scale and high-precision measurement, improvement is made in the collaborative phase-shift laser ranging device and method, such that the requirements for the measurement range of several hundred thousand kilometers are met, and the submillimeter-grade even micron-grade measurement accuracy can be reached at the same time.

SUMMARY

The present disclosure provides a collaborative phase-shift laser ranging device based on differential modulation and demodulation of coarse and precise measuring wavelength and a ranging method thereof, so as to solve the problem of sharp attenuation of return laser energy during ultra-long distance measurement, and avoid low ranging accuracy or even difficulty in completing ranging caused by a low signal-to-noise ratio of measuring signals. Meanwhile, the collaborative phase-shift laser ranging device needs to meet the requirements for large-scale and high-precision measurement, such that the phase-shift laser ranging technology can achieve submillimeter-grade or even micron-grade accurate measurement within the measurement range of several hundred thousand kilometers, thereby meeting the future demands on manufacturing of large-sized equipment, deep space navigation of spacecrafts, rendezvous and docking and distributed satellite formation, and other fields. To resolve the foregoing technical problems, the present disclosure provides the following technical solutions:

A collaborative phase-shift laser ranging device based on differential modulation and demodulation of coarse and precise measuring wavelength, the device including a measuring terminal and a collaboration terminal, the measuring terminal including a multi-frequency generating module producing three paths of output, a laser modulation module, a measuring-terminal light path, and a light signal receiving and processing module, where two of the three paths of output are input to the laser modulation module for laser modulation, the other one path of output is input to the light signal receiving and processing module, output light from the laser modulation module is input to the measuring-terminal light path, and two paths of output light from the measuring-terminal light path are input to the measuring terminal light signal receiving and processing module as measurement light signals and reference light signals, respectively, for phase detection.

Preferably, the multi-frequency generating module includes a first crystal oscillator, a second crystal oscillator, a third crystal oscillator, a first phase locked frequency multiplier, a second phase locked frequency multiplier, a third phase locked frequency multiplier, a fourth phase locked frequency multiplier, a first amplifying circuit, a second amplifying circuit, a third amplifying circuit, a fourth amplifying circuit, a fifth amplifying circuit, a first power combiner and a second power combiner;

an output terminal of the first crystal oscillator is connected to an input terminal of the first phase locked frequency multiplier and passes through the first amplifying circuit; an output signal of the first crystal oscillator is connected to an input terminal of the second phase locked frequency multiplier and passes through the second amplifying circuit, an output terminal of the second crystal oscillator is connected to an input terminal of the third amplifying circuit, and an output signal of the third crystal oscillator is connected to an input terminal of the third phase locked frequency multiplier and passes through the fourth amplifying circuit; an output signal of the third crystal oscillator is connected to an input terminal of the fourth phase locked frequency multiplier and passes through the fifth amplifying circuit; an output terminal of the first amplifying circuit and an output terminal of the fifth amplifying circuit are input to two input terminals of the first power combiner, respectively, an output terminal of the first power combiner is connected to an input terminal of a first electro-optical modulator as a driving signal, an output terminal of the second power combiner is connected to an input terminal of a second electro-optical modulator as a driving signal, and an output terminal of the second amplifying circuit is connected to input terminals of a third electro-optical modulator and a fourth electro-optical modulator as a driving signal.

Preferably, the laser modulation module includes a laser source, the first electro-optical modulator, the second electro-optical modulator, a first two-path beam-splitting optical fiber and a second two-path beam-splitting optical fiber; an output of the laser source is connected to the first two-path beam-splitting optical fiber to be split into two paths, an output terminal of one path of the first two-path beam-splitting optical fiber is connected to the input terminal of the first electro-optical modulator, an output terminal of the other path is connected to the input terminal of the second electro-optical modulator, output terminals of the first electro-optical modulator and the second electro-optical modulator are connected to two input terminals of the second two-path beam-splitting optical fiber, respectively, and an output terminal of the second two-path beam-splitting optical fiber is connected to an input terminal of a measuring-terminal light path.

Preferably, the measuring-terminal light path includes a first collimator, a second collimator, a third collimator, a beam splitter and a beam expander group; the output terminal of the second two-path beam-splitting optical fiber is connected to an input terminal of the first collimator, an output terminal of the first collimator is connected to the beam splitter, one path of output of the beam splitter is connected to an input terminal of the second collimator as reference light, an output terminal of the second collimator is connected to one input terminal of the light signal receiving and processing module, the other path of output of the beam splitter is connected to an input terminal of the beam expander group, an output terminal of the beam expander group is connected to an input of a collaboration-terminal light path, an output of the collaboration-terminal light path is connected to an input terminal of the beam splitter via the beam expander group, an output terminal of the beam splitter is connected to an input terminal of the third collimator as measurement light, and an output terminal of the third collimator is connected to the other input terminal of the light signal receiving and processing module.

Preferably, the light signal receiving and processing module includes a third two-path beam-splitting optical fiber, a fourth two-path beam-splitting optical fiber, the third electro-optical modulator, the fourth electro-optical modulator, a first photoelectric detector, a second photoelectric detector, a third photoelectric detector, a fourth photoelectric detector, a sixth amplifying circuit, a seventh amplifying circuit, an eighth amplifying circuit, a ninth amplifying circuit, a first filtering circuit, a second filtering circuit, a third filtering circuit, a fourth filtering circuit and a high-precision phase-detection board card; one output terminal of the measuring-terminal light path is split into two paths after being connected with an input terminal of the third two-path beam-splitting optical fiber as reference light, one output terminal of the third two-path beam-splitting optical fiber is connected to an input terminal of the third electro-optical modulator, the input terminal of the third electro-optical modulator is connected to an input terminal of the first photoelectric detector, an output terminal of the first photoelectric detector, the sixth amplifying circuit and the first filtering circuit are connected in sequence, an output terminal of the first filtering circuit is connected to the high-precision phase-detection board card, and the other output terminal of the third two-path beam-splitting optical fiber, upon connection to an input terminal of the second photoelectric detector, is connected to the high-precision phase-detection board card after passing through the seventh amplifying circuit and the second filtering circuit in sequence;

the other output terminal of the measuring-terminal light path is connected with an input terminal of the fourth two-path beam-splitting optical fiber as measurement light and is split into two paths, an output terminal of one path of the fourth two-path beam-splitting optical fiber is connected to an input terminal of the fourth electro-optical modulator, an output terminal of the fourth electro-optical modulator, the third photoelectric detector, the eighth amplifying circuit and the third filtering circuit are connected in sequence, and an output terminal of the third filtering circuit is connected to the high-precision phase-detection board card; an output terminal of the other path of the fourth two-path beam-splitting optical fiber is connected to an input terminal of the fourth photoelectric detector, and is connected to the high-precision phase-detection board card though the ninth amplifying circuit and the fourth filtering circuit in sequence.

Preferably, the collaboration terminal is located at a measured target and includes a collaboration-terminal light path, a collaboration-terminal laser modulation module, a multi-frequency modulation signal processing module and a collaboration-terminal light signal receiving and processing module; the collaboration-terminal light path receives measurement signals from the measuring terminal, an output of the collaboration-terminal active laser modulation module is connected to an input of the collaboration-terminal light path, two paths of output of the collaboration-terminal light path are connected to the collaboration-terminal light signal receiving and processing module, the collaboration-terminal light signal receiving and processing module produces three paths of output which are connected to the multi-frequency modulation signal processing module as an input, and the multi-frequency modulation signal processing module produces three paths of output, where two of the three paths of output are input to the collaboration-terminal laser modulation module, and the other one path of output is input to the collaboration-terminal light signal receiving and processing module.

A collaborative phase-shift laser ranging method based on differential modulation and demodulation of coarse and precise measuring wavelength, including the following steps:

step 1, generating, by the multi-frequency generating module of the measuring terminal sinusoidal signals with frequencies of $v_1$, $v_1-f_1$, $v_2$, $v_3$ and $v_3+f_1$, modulating the intensity of a laser beam output from the laser source by means of electro-optic intensity modulation to produce light signals with frequencies of $v_1$, $v_2$, $v_3$ and $v_3+f$, and splitting the light beam into two beams, with one beam emitted to a target to be measured as measurement light, and the other beam used as a reference signal of the measuring terminal; where the frequency of a precision gauge is $v_1$, the frequency of a secondary precision gauge is $v_2$, and the frequency of a coarseness gauge is f;

step 2, placing the ranging collaboration terminal at the target to be measured and producing sinusoidal electric signals $X(v_1-f_1, \varphi_{v_1 0})$, $X(v_3, \varphi_{v_3 0})$, receiving at the collaboration terminal measurement signals from the measuring terminal, which are then split into two parts, conducting secondary modulation on one part of light beams by the electro-optical intensity modulators, producing difference frequency signals with the frequency of $f_1$ from precision gauge signals under the modulation of sinusoidal waves with the frequency of $v_1-f_1$ at the collaboration terminal, the phase $\varphi_{v_1}'$ of the difference frequency signals possessing ranging phase information of the precision gauge $v_1$, and producing difference frequency electric signals $Y(f_1, \varphi_{v_1}'-\varphi_{v_1 0})$ with the frequency of $f_1$ upon conversion and separation by using the photoelectric detectors and filters; detecting a difference frequency signal f of $v_3$ and $v_3+f$ in the other part of measurement light beams by the photoelectric detectors as the coarseness gauge, taking a phase $\varphi_f'$ of the difference frequency signal f as a coarseness result, and upon conversion and separation by using the photoelectric detectors and filters, obtaining electric signals $Y(v_2, \varphi_{v_2}')$ and $Y(f, \varphi_f')$ of the secondary precision gauge $v_2$ and the coarseness gauge f respectively;

step 3, using the extracted electric signals with phase information as modulation signals to modulate intensity of output light of the collaboration-terminal laser source; mixing the electric signals $Y(f_1, \varphi_{v_1}'-\varphi_{v_1 0})$ with the ranging phase information of the precision gauge with the signals $X(v_1-f_1, \varphi_{v_1 0})$ with the frequency $v_1-f_1$ of the collaboration terminal to restore the precision gauge $v_1$ with precision phase information; mixing the coarseness gauge $Y(f, \varphi_f')$ with electric signals $X(v_3, \varphi_{v_3 0})$ with the frequency of $v_3$ produced by the collaboration terminal to obtain electric signals with the frequency of $v_3+f$; and using the foregoing electric signals with frequencies of $v_1$, $v_2$, $v_3$ and $v_3+f$ to modulate laser beams output from the collaboration terminal by means of intensity modulation;

step 4, taking laser at the collaboration terminal upon modulation as measurement return light of a target terminal, splitting the laser into two beams, with one beam transmitted back to the measuring terminal, and the other beam used as a reference signal at the collaboration terminal, and input to the light signal receiving and processing module of the collaboration terminal for measurement and compensation of additional phase retardation at the collaboration terminal; firstly, conducting modulation via the electro-optical modulators, producing difference frequency signals $Y(f_1, \varphi_{v_1}''-\varphi_{v_1 0})$ with the frequency of $f_1$ and phase information of the precision gauge $v_1-f_1$ in return light under the modulation of signals $X(v_1-f_1, \varphi_{v_1 0})$ with the frequency of $v_1-f_1$ at the collaboration terminal, then conducting phase difference measurement on the difference frequency signals, together with electric signals $Y(f_1, \varphi_{v_1}'-\varphi_{v_1 0})$ with the frequency of $f_1$ as processed in the measurement return laser, sending $\Delta\varphi_{v_1}$ to the measuring terminal in real time through a laser communication module, and carrying out real-time compensation at the measuring terminal, where the measured phase difference $\Delta\varphi_{v_1}=\varphi_{v_1}''-\varphi_{v_1}'$ is the additional phase value of the precision gauge produced by the collaboration terminal, which varies with the change of environmental parameters of the collaboration terminal, and exerts a great influence on the ranging accuracy; on the other hand, given that the additional phase value drift of the coarseness gauge f and the secondary precision gauge $v_2$ at the collaboration terminal exhibits no effect on the ranging accuracy, calibrating the additional phase value in advance by a phase difference calibration and compensation unit, and introducing fixed compensation phase values $\Delta\varphi_{v_2}$, $\Delta\varphi_f$ of the corresponding gauges into the measuring terminal;

step 5, receiving the measurement return light at the measuring terminal, demodulating reference signals at the measuring terminal and one part of light in measurement return light signals by means of secondary electro-optical intensity modulation, respectively, and under the modulation of electric signals with the frequency of $v_1-f_1$ at the measuring terminal, producing difference frequency signals with the frequency of $f_1$ and phase information of the precision gauge $v_1$, which are then converted into electric signals by the photoelectric detectors; converting the reference signals at the measuring terminal and the other part of light in the measurement return light signals into electric signals by using the photoelectric detectors, separating out electric signals with the frequencies of $v_2$ and f by the filters, and taking the electric signals as the difference frequency signals between the reference light signals and the light signals with the frequencies of $v_3$ and $v_3+f$ in the measurement return light, where f denotes the frequency of the coarseness gauge, and the phase of the difference frequency signals denotes the ranging result of the coarseness gauge; measuring the phase differences between the reference electric signals with frequencies of $f_1$, $v_2$, and f and electric signals of the measurement return light as $\varphi_{v_1}$, $\varphi_{v_2}$ and $\varphi_f$, respectively, and obtaining ranging results of $\varphi_{v_1}-\Delta\varphi_{v_1}$, $\varphi_{v_2}-\Delta\varphi_{v_2}$ and $\varphi_f-\Delta\varphi_f$ from the multiple gauges;

step 6, using a data synthesis unit of the high-precision phase-detection board card synthesizes three phase differences and generates a distance value, where the coarseness gauge has a frequency of f and a wavelength of λ, and the distance measurement value of the coarseness gauge is expressed by the following equation:

$$D_{coal} = \frac{\lambda(\varphi_f - \Delta\varphi_f)}{4\pi}$$

signals with a frequency of $v_2$ denote the secondary coarseness gauge which has a wavelength of $\lambda_2$, and the distance measurement value of the secondary coarseness gauge is expressed by the following equation:

$$D_{coa2} = \frac{\lambda_2}{2}\left[\text{floor}\left(\frac{2D_{coa}}{\lambda_2} - \frac{\varphi_{v_2} - \Delta\varphi_{v_2}}{2n\pi} + \frac{1}{2}\right) + \frac{\varphi_{v_2} - \Delta\varphi_{v_2}}{2n\pi}\right];$$

and signals with a frequency of $v_1$ denote the precision gauge which has a wavelength of $\lambda_1$, and the measured distance is expressed by the following equation:

$$D_{coa2} = \frac{\lambda_1}{2}\left[\text{floor}\left(\frac{2D_{coa2}}{\lambda_1} - \frac{\varphi_{v_1} - \Delta\varphi_{v_1}}{2n\pi} + \frac{1}{2}\right) + \frac{\varphi_{v_1} - \Delta\varphi_{v_1}}{2n\pi}\right]$$

where floor( ) function is a rounding function.

The present disclosure has the following beneficial effects:

The ranging collaboration terminal of the present disclosure can solve the problems of low ranging accuracy or even the failure to complete ranging due to the sharp attenuation in energy and low signal-to-noise ratio during long-distance measurement application. The collaboration terminal detects measurement signals and filters and amplifies the signals respectively, and then the signals are synchronously modulated to the laser source of the collaboration terminal by electro-optical intensity modulation as the measurement return light. In this way, measurement signals are amplified while the phase is kept unchanged, the energy and the signal-to-noise ratio of measurement return light are increased, and biquadratic attenuation of the measured distance to the quadratic attenuation for the energy of the measurement return light is lowered.

Different from existing active collaborative phase-shift laser ranging methods, the measuring terminal and the collaboration terminal of the present disclosure externally modulate an exciter through electro-optical intensity modulation. This modulation mode has the advantages of large bandwidth, the capability to synchronously modulate coarse and precise measuring wavelength with frequencies ranging from tens of MHz to tens of GHz, and a higher frequency of precision gauges, followed by a higher theoretical accuracy; at the same time, the collaboration terminal reproduces coarseness gauge signals fby means of differential modulation. That is, the collaboration terminal detects the coarseness gauge signal and produces two paths of high-frequency signals with a frequency difference off and a phase difference of a coarseness result through mixing, such that the collaboration-terminal laser source is subject to differential modulation, lowing the frequency of the coarseness gauge to tens of kHz or even tens of Hz. The method and the device break the limitation of the modulation bandwidth on the frequency of the coarse and precise measuring wavelength, so that the collaborative phase-shift laser ranging technology can meet the requirements for long-distance and high-precision measurement without increasing the emergent power of laser, which is one of the innovations differentiating the present disclosure from the existing device.

Due to the limitation of the bandwidth of the existing detection devices, it is difficult to directly or effectively detect precision gauge signals with tens of GHz, which hinders the improvement of both the signal frequency of a precision gauge, and the accuracy of collaborative phase-shift laser ranging technology in principle. According to the present disclosure, the collaboration terminal demodulates the precision gauge with differential modulation, which not only obtains the precision phase information, but also avoids the detection of high frequency signals, such that the frequency of the precision gauge can be improved without the limitation of the bandwidth of the detector. At the same time, in contrast with the direct detection of measurement signals, the signal-to-noise ratio of electric signals as detected by the differential modulation will be improved somewhat, and the signal-to-noise ratio of return light produced after processing such signals and modulating the same to the collaboration-terminal laser source will also be improved, making the phase-shift laser ranging technology with a collaboration terminal all the more accurate. The present disclosure has broken the limit of the detectors bandwidth on the accuracy of the phase-shift laser ranging technology, enabling the collaborative phase-shift laser ranging technology to meet the requirements for both large-range measurement and high-precision measurement. This is the second innovation that differentiates the present disclosure from the existing device.

Figure 1:
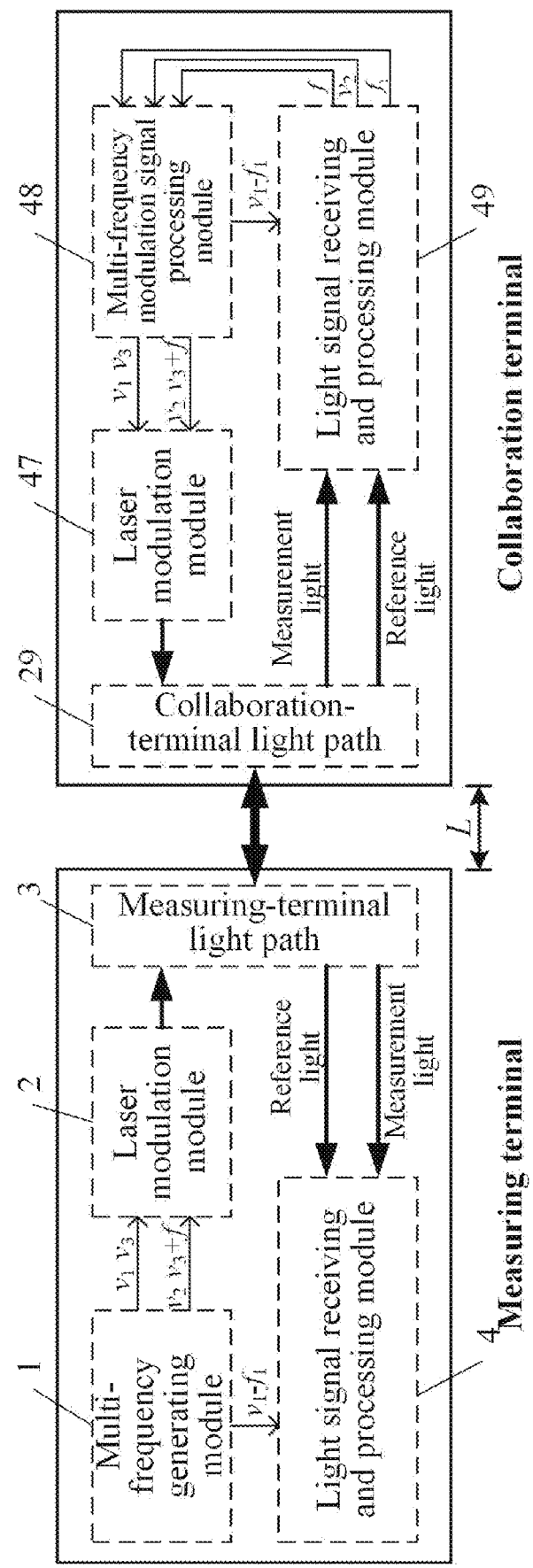
FIG. 1 is a schematic diagram of an overall structure of a high-precision multi-frequency synchronous collaborative ranging device according to the present disclosure.

In the figure, 1. multi-frequency generating module, 2. laser modulation module, 3. measuring-terminal light path, 4. light signal receiving and processing module, 5. first crystal oscillator, 6. second crystal oscillator, 7. third crystal oscillator, 8. first phase locked frequency multiplier, 9. second phase locked frequency multiplier, 10. third phase locked frequency multiplier, 11. fourth phase locked frequency multiplier, 12. first amplifying circuit, 13. second amplifying circuit, 14. third amplifying circuit, 15. fourth amplifying circuit, 16. fifth amplifying circuit, 17. first power combiner, 18. second power combiner, 19. laser source, 20. first two-path beam-splitting optical fiber, 21. first electro-optical modulator, 22. second electro-optical modulator, 23. second two-path beam-splitting optical fiber, 24. first collimator, 25. second collimator, 26. third collimator, 27. beam splitter, 28. beam expander group, 29. collaboration-terminal light path, 30. third two-path beam-splitting optical fiber, 31. fourth two-path beam-splitting optical fiber, 32. third electro-optical modulator, 33. fourth electro-optical modulator, 34. first photoelectric detector, 35. second photoelectric detector, 36. third photoelectric detector, 37. fourth photoelectric detector, 38. sixth amplifying circuit, 39. seventh amplifying circuit, 40. eighth amplifying circuit, 41. ninth amplifying circuit, 42. first filtering circuit, 43. second filtering circuit, 44. third filtering circuit, 45. fourth filtering circuit, 46. high-precision phase-detection board card, 47. collaboration-terminal laser modulation module, 48. multi-frequency modulation signal processing module, 49. collaboration-terminal light signal receiving and processing module, 50. collaboration-terminal beam expander group, 51. collimator A, 52. collimator B, 53. collimator C, 54. collaboration-terminal beam splitter, 55. two-path beam-splitting optical fiber A, 56. two-path beam-splitting optical fiber B, 57. two-path beam-splitting optical fiber C, 58. electro-optical modulator A, 59. electro-optical modulator B, 60. photoelectric detector A, 61. photoelectric detector B, 62. photoelectric detector C, 63. photoelectric detector D, 64. amplifying circuit A, 65. amplifying circuit B, 66. amplifying circuit C, 67. amplifying circuit D, 68. filtering circuit A, 69. filtering circuit B, 70. filtering circuit C, 71. filtering circuit D, 72. phase difference measurement unit, 73. laser communication unit, 74. phase difference calibration and compensation unit, 75. crystal oscillator A, 76. crystal oscillator B, 77. phase locked frequency multiplier A, 78. phase locked frequency multiplier B, 79. amplifying circuit E, 80. amplifying circuit F, 81. filtering circuit E, 82. filtering circuit F, 83. mixer A, 84. mixer B, 85. power combiner A, 86. power combiner B, 87. collaboration-terminal laser source, 88. two-path beam-splitting optical fiber D, 89. electro-optical modulator C and 90. electro-optical modulator D.

DETAILED DESCRIPTION OF THE EMBODIMENTS

The present disclosure is described in detail below with reference to specific embodiments.

Embodiment 1

Figure 2:
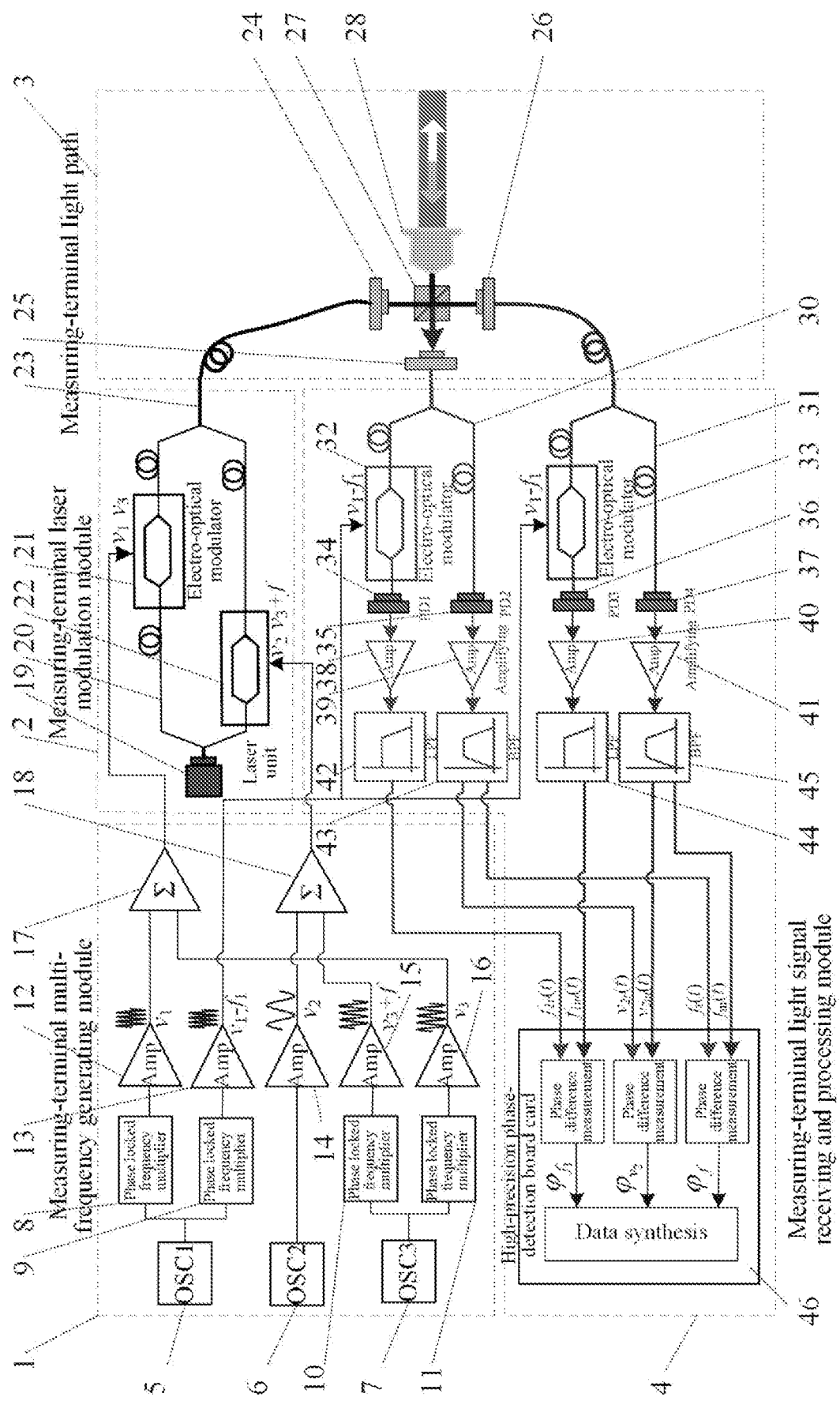
FIG. 2 is a schematic structural diagram of a measuring terminal in the collaborative ranging device.
Figure 3:
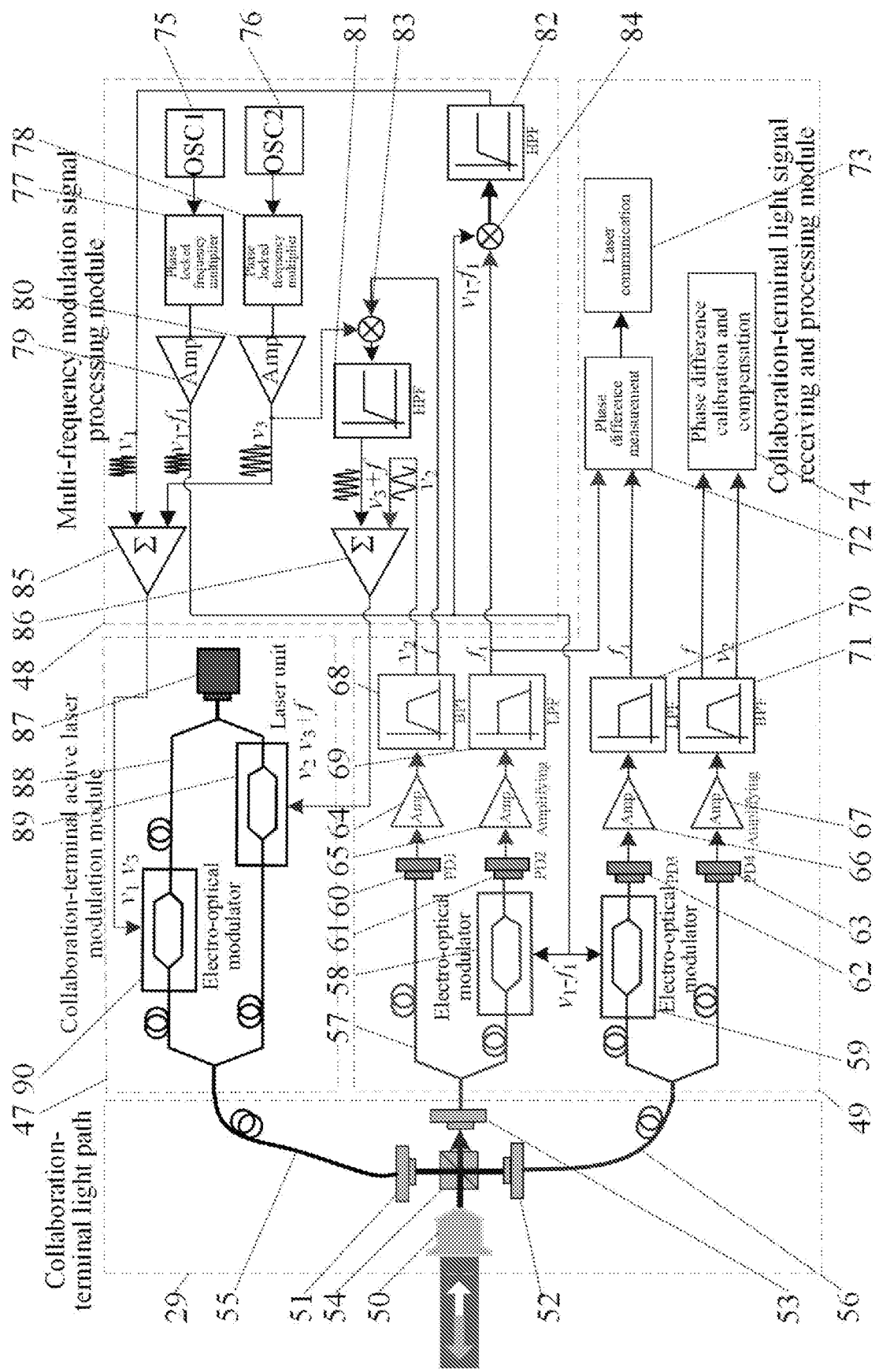
FIG. 3 is a schematic structural diagram of a collaboration terminal in the collaborative ranging device.

As shown in FIGS. 1-3, a collaborative phase-shift laser ranging method based on differential modulation and demodulation of coarse and precise measuring wavelength includes the following steps:

step 1: the multi-frequency generating module of the measuring terminal produces sinusoidal signals with frequencies of $v_1$, $v_1-f_1$, $v_2$, $v_3$ and $v_3+f$, the intensity of a laser beam output from the laser source is modulated by means of electro-optic intensity modulation to produce light signals with frequencies of $v_1$, $v_2$, $v_3$ and $v_3+f$, and the light beam is split into two beams, with one beam emitted to a target to be measured as measurement light, and the other beam used as a reference signal of the measuring terminal; where the frequency of a precision gauge is $\varphi_{v1}'$, the frequency of a secondary precision gauge is $v_2$, and the frequency of a coarseness gauge is f;

step 2: the ranging collaboration terminal is located at the target to be measured and produces sinusoidal electric signals $X(v_1-f_1, \varphi_{v_10})$, $X(v_3, \varphi_{v_30})$, measurement signals from the measuring terminal are received at the collaboration terminal, and are split into two parts, one part of light beams are subject to secondary modulation by the electro-optical intensity modulators, difference frequency signals with the frequency of $f_1$ are produced from precision gauge signals under the modulation of sinusoidal waves with the frequency of $v_1-f_1$ at the collaboration terminal, the phase $\varphi_{v1}'$ of the difference frequency signals possesses ranging phase information of the precision gauge $v_1$, and difference frequency electric signals $Y(f_1, \varphi_{v1}'-\varphi_{v_10})$ with the frequency of $f_1$ are produced upon conversion and separation by using the photoelectric detectors and filters; a difference frequency signal f of $v_3$ and $v_3+f$ in the other part of measurement light beams are detected by the photoelectric detectors as the coarseness gauge, a phase $\varphi_f'$ of the difference frequency signal f is taken as a coarseness result, and upon conversion and separation by using the photoelectric detectors and filters, electric signals $Y(v_2, \varphi_{v2}')$ and $Y(f, \varphi_f')$ of the secondary precision gauge $v_2$ and the coarseness gauge f are obtained respectively;

step 3: the foregoing extracted electric signals with phase information are used as modulation signals to modulate intensity of output light of the collaboration-terminal laser source; firstly, the electric signals $Y(f_1, \varphi_{v1}'-\varphi_{v_10})$ with the ranging phase information of the precision gauge are mixed with the signals $X(v_1-f_1, \varphi_{v_10})$ with the frequency $v_1-f_1$ of the collaboration terminal to restore the precision gauge $v_1$ with precision phase information; the coarseness gauge $Y(f, \varphi_f')$ is mixed with electric signals $X(v_3, \varphi_{v_30})$ with the frequency of $v_3$ produced by the collaboration terminal to obtain electric signals with the frequency of $v_3+f$; and the foregoing electric signals with frequencies of $v_1$, $v_2$, $v_3$ and $v_3+f$ are used to modulate laser beams output from the modulation terminal by means of intensity modulation;

step 4: laser at the collaboration terminal, upon modulation, is taken as measurement return light of a target terminal and is split into two beams, with one beam transmitted back to the measuring terminal, and the other beam used as a reference signal at the collaboration terminal, and input to the light signal receiving and processing module of the collaboration terminal for measurement and compensation of additional phase retardation at the collaboration terminal; firstly, modulation is conducted via the electro-optical modulators, difference frequency signals $Y(F_1, \varphi_{v1}''-\varphi_{v_10})$ with the frequency of $f_1$ and phase information of the precision gauge $v_1$ in return light are produced under the modulation of signals $X(v_1-f_1, \varphi_{v_10})$ with the frequency of $v_1-f_1$ at the collaboration terminal, then the difference frequency signals are subject to phase difference measurement, together with electric signals $Y(f_1, \varphi_{v1}'-\varphi_{v_10})$ with the frequency of $f_1$ as processed in the measurement light, the measured phase difference $\Delta\varphi_{v_1}=\varphi_{v_1}''-\varphi_{v_1}'$ is the additional phase value of the precision gauge produced by the collaboration terminal, which varies with the change of environmental parameters of the collaboration terminal, and exerts a great influence on the ranging accuracy, $\Delta\varphi_{v_1}$ is sent to the measuring terminal in real time through a laser communication module, and real-time compensation is carried out at the measuring terminal; on the other hand, the additional phase value drift of the coarseness gauge f and the secondary precision gauge $v_2$ at the collaboration terminal exhibits no effect on the ranging accuracy, and the additional phase value thereof is calibrated in advance by a phase difference calibration and compensation unit, and fixed compensation phase values $\Delta\varphi_{v_2}$, $\Delta\varphi_f$ of the corresponding gauges are introduced into the measuring terminal;

step 5: the measurement return light is received at the measuring terminal, firstly, reference signals at the measuring terminal and one part of light in measurement return light signals are demodulated by means of secondary electro-optical intensity modulation, respectively, and under the modulation of electric signals with the frequency of $v_1-f_1$ at the measuring terminal, difference frequency signals with the frequency of $f_1$ and phase information of the precision gauge $v_1$ are produced, which are then converted into electric signals by the photoelectric detectors; the reference signals at the measuring terminal and the other part of light in the measurement return light signals are converted into electric signals by using the photoelectric detectors, and electric signals with the frequencies of $v_2$ and f are separated out by the filters with f denoting the frequency of the coarseness gauge, and are taken as the difference frequency signals between the reference light signals and the light signals with the frequencies of $v_3$ and $v_3$+f in the measurement return light, of which the phase denotes the ranging result of the coarseness gauge; the phase differences between the reference electric signals with frequencies of $f_1$, $v_2$, and f and electric signals of the measurement return light are measured as $\varphi_{v_1}$, $\varphi_{v_2}$ and $\varphi_f$, respectively, and ranging results of the multiple gauges are $\varphi_{v_1}-\Delta\varphi_{v_1}$, $\varphi_{v_2}-\Delta\varphi_{v_2}$ and $\varphi_f-\Delta\varphi_f$; and step 6: a data synthesis unit of the high-precision phase-detection board card synthesizes three phase differences to generate a distance value, the coarseness gauge has a frequency of f, and a wavelength of $\lambda$ and the distance measurement value of the coarseness gauge is $$D_{coa1} = \frac{\lambda(\varphi_f - \Delta\varphi_f)}{4\pi};$$

signals with a frequency of $v_2$ denote the secondary coarseness gauge which has a wavelength of $\lambda_2$, and the distance measurement value of the secondary coarseness gauge is $$D_{coa2} = \frac{\lambda_2}{2}\left[\text{floor}\left(\frac{2D_{coa}}{\lambda_2} - \frac{\varphi_{v_2} - \Delta\varphi_{v_2}}{2n\pi} + \frac{1}{2}\right) + \frac{\varphi_{v_2} - \Delta\varphi_{v_2}}{2n\pi}\right];$$

signals with a frequency of $v_1$ denote the precision gauge which has a wavelength of $\lambda_1$, and the measured distance is $$D = \frac{\lambda_1}{2}\left[\text{floor}\left(\frac{2D_{coa2}}{\lambda_1} - \frac{\varphi_{v_1} - \Delta\varphi_{v_1}}{2n\pi} + \frac{1}{2}\right) + \frac{\varphi_{v_1} - \Delta\varphi_{v_1}}{2n\pi}\right],$$

where floor( ) function is a rounding function.

A collaborative phase-shift laser ranging device based on differential modulation and demodulation of coarse and precise measuring wavelength is applicable to the aforesaid phase-shift laser ranging method based on synchronous collaboration of multiple high-precision gauges, the device including a measuring terminal and a collaboration terminal; the measuring terminal includes a multi-frequency generating module 1 producing three paths of output, a laser modulation module 2, a measuring-terminal light path 3, and a light signal receiving and processing module 4, where two of the three paths of output are input to the laser modulation module 2 for laser modulation, the other one path of output is input to the light signal receiving and processing module 4, output light from the laser modulation module 2 is input to the measuring-terminal light path 3, and two paths of output light from the measuring-terminal light path 3 are input to the measuring terminal light signal receiving and processing module 4 as measurement light signals and reference light signals, respectively, for phase detection;

the multi-frequency generating module 1 includes a first crystal oscillator 5, a second crystal oscillator 6, a third crystal oscillator 7, a first phase locked frequency multiplier 8, a second phase locked frequency multiplier 9, a third phase locked frequency multiplier 10, a fourth phase locked frequency multiplier 11, a first amplifying circuit 12, a second amplifying circuit 13, a third amplifying circuit 14, a fourth amplifying circuit 15, a fifth amplifying circuit 16, a first power combiner 17 and a second power combiner 18; an output terminal of the first crystal oscillator 5 is connected to an input terminal of the first phase locked frequency multiplier 8 and passes through the first amplifying circuit 12; an output signal of the first crystal oscillator 5 is connected to an input terminal of the second phase locked frequency multiplier 9 and passes through the second amplifying circuit 13, an output terminal of the second crystal oscillator 6 is connected to an input terminal of the third amplifying circuit 14, and an output signal of the third crystal oscillator 7 is connected to an input terminal of the third phase locked frequency multiplier 10 and passes through the fourth amplifying circuit 15; an output signal of the third crystal oscillator 7 is connected to an input terminal of the fourth phase locked frequency multiplier 11 and passes through the fifth amplifying circuit 16; an output terminal of the first amplifying circuit 12 and an output terminal of the fifth amplifying circuit 16 are input to two input terminals of the first power combiner 17, respectively, an output terminal of the first power combiner 17 is connected to an input terminal of a first electro-optical modulator 21 as a driving signal, an output terminal of the second power combiner 18 is connected to an input terminal of a second electro-optical modulator 22 as a driving signal, and an output terminal of the second amplifying circuit 14 is connected to input terminals of a third electro-optical modulator 32 and a fourth electro-optical modulator 33 as a driving signal; and the laser modulation module 2 includes a laser source 19, the first electro-optical modulator 21, the second electro-optical modulator 22, a first two-path beam-splitting optical fiber 20 and a second two-path beam-splitting optical fiber 23. An output of the laser source 19 is connected to the first two-path beam-splitting optical fiber 20 to be split into two paths, an output terminal of one path of the first two-path beam-splitting optical fiber 20 is connected to the input terminal of the first electro-optical modulator 21, an output terminal of the other path is connected to the input terminal of the second electro-optical modulator 22, output terminals of the first electro-optical modulator 21 and the second electro-optical modulator 22 are connected to two input terminals of the second two-path beam-splitting optical fiber 23, respectively, and an output terminal of the second two-path beam-splitting optical fiber 23 is connected to an input terminal of a measuring-terminal light path 3; and the measuring-terminal light path 3 includes a first collimator 24, a second collimator 25, a third collimator 26, a beam splitter 27 and a beam expander group 28. The output terminal of the second two-path beam-splitting optical fiber 23 is connected to an input terminal of the first collimator 24, an output terminal of the first collimator 24 is connected to the beam splitter 27, one path of output of the beam splitter 27 is connected to an input terminal 25 of the second collimator as reference light, an output terminal of the second collimator 25 is connected to one input terminal of the light signal receiving and processing module 4, the other path of output of the beam splitter 27 is connected to an input terminal of the beam expander group 28, an output terminal of the beam expander group 28 is connected to an input of a collaboration-terminal light path 29, an output of the collaboration-terminal light path 29 is connected to an input terminal of the beam splitter 27 via the beam expander group 28, an output terminal of the beam splitter 27 is connected to an input terminal of the third collimator 26 as measurement light, and an output terminal of the third collimator 26 is connected to the other input terminal of the light signal receiving and processing module 4; and the light signal receiving and processing module 4 includes a third two-path beam-splitting optical fiber 30, a fourth two-path beam-splitting optical fiber 31, the third electro-optical modulator 32, the fourth electro-optical modulator 33, a first photoelectric detector 34, a second photoelectric detector 35, a third photoelectric detector 36, a fourth photoelectric detector 37, a sixth amplifying circuit 38, a seventh amplifying circuit 39, an eighth amplifying circuit 40, a ninth amplifying circuit 41, a first filtering circuit 42, a second filtering circuit 43, a third filtering circuit 44, a fourth filtering circuit 45 and a high-precision phase-detection board card 46. One output terminal of the measuring-terminal light path 3 is split into two paths after being connected with an input terminal of the third two-path beam-splitting optical fiber 30 as reference light, one output terminal of the third two-path beam-splitting optical fiber 30 is connected to an input terminal of the third electro-optical modulator 32, the input terminal of the third electro-optical modulator 32 is connected to an input terminal of the first photoelectric detector 34, an output terminal of the first photoelectric detector 34, the sixth amplifying circuit 38 and the first filtering circuit 42 are connected in sequence, an output terminal of the first filtering circuit 42 is connected to the high-precision phase-detection board card, and the other output terminal of the third two-path beam-splitting optical fiber 30, upon connection to an input terminal of the second photoelectric detector 35, is connected to the high-precision phase-detection board card after passing through the seventh amplifying circuit 39 and the second filtering circuit 43 in sequence; the other output terminal of the measuring-terminal light path 3 is connected with an input terminal of the fourth two-path beam-splitting optical fiber 31 as measurement light and is split into two paths, an output terminal of one path of the fourth two-path beam-splitting optical fiber 31 is connected to an input terminal of the fourth electro-optical modulator 33, an output terminal of the fourth electro-optical modulator 33, the third photoelectric detector 36, the eighth amplifying circuit 40 and the third filtering circuit 44 are connected in sequence, and an output terminal of the third filtering circuit 44 is connected to the high-precision phase-detection board card 46; an output terminal of the other path of the fourth two-path beam-splitting optical fiber 31 is connected to an input terminal of the fourth photoelectric detector 37, and is connected to the high-precision phase-detection board card 46 though the ninth amplifying circuit 41 and the fourth filtering circuit 45 in sequence;

the collaboration terminal is located at a measured target and includes a collaboration-terminal light path 29, a collaboration-terminal laser modulation module 47, a multi-frequency modulation signal processing module 48 and a collaboration-terminal light signal receiving and processing module 49; the collaboration-terminal light path 29 receives measurement signals from the measuring terminal, an output of the collaboration-terminal active laser modulation module 49 is connected to an input of the collaboration-terminal light path 29, two paths of output of the collaboration-terminal light path 29 are connected to the collaboration-terminal light signal receiving and processing module 49, the collaboration-terminal light signal receiving and processing module 49 produces three paths of output which are connected to the multi-frequency modulation signal processing module 48 as an input, and the multi-frequency modulation signal processing module 48 produces three paths of output, where two of the three paths of output are input to the collaboration-terminal laser modulation module 47, and the other one path of output is input to the collaboration-terminal light signal receiving and processing module 49;

the collaboration-terminal light path 29 includes a collaboration-terminal beam expander group 50, a collimator A51, a collimator B52, a collimator C53, a collaboration-terminal beam splitter 54, a two-path beam-splitting optical fiber A55, a two-path beam-splitting optical fiber B56, and a two-path beam-splitting optical fiber C57; the collaboration-terminal beam expander group 50 receives the measurement light signals from the measuring terminal, an output thereof is connected with the collaboration-terminal beam splitter 54, the corresponding output of the beam splitter 54 is connected with the two-path beam-splitting optical fiber C57 through the collimator C53, the output of the laser modulation module 47 is connected to the collaboration-terminal beam splitter 54 through the collimator A51 and the two-path beam-splitting optical fiber A55, and in the corresponding two paths of output of the beam splitter 54, one path of output is connected to the beam expander group 50 and is transmitted back to the measuring terminal through the beam expander group 50, and the other one path of output is connected with the two-path beam-splitting optical fiber B56 through the collimator B52;

the collaboration-terminal light signal receiving and processing module 49 includes an electro-optical modulator A58, an electro-optical modulator B59, a photoelectric detector A60, a photoelectric detector B61, a photoelectric detector C62, a photoelectric detector D63, an amplifying circuit A64, an amplifying circuit B65, an amplifying circuit C66, an amplifying circuit D67, a filtering circuit A68, a filtering circuit B69, a filtering circuit C70, a filtering circuit D71, a phase difference measurement unit 72, a laser communication unit 73 and a phase difference calibration and compensation unit 74; an output of the collaboration-terminal light signal receiving and processing module 49 is connected to modulation signal input ports of the electro-optical modulator A58 and the electro-optical modulator B59, one path of output of the two-path beam-splitting optical fiber C57 is connected with the photoelectric detector A60, the amplifying circuit A64, and the filtering circuit A68 in sequence with the output of the filtering circuit A68 connected to the multi-frequency modulation signal processing module 48, the other path of output of the two-path beam-splitting optical fiber C57 is connected with the electro-optical modulator A58, the photoelectric detector B61, the amplifying circuit C65 and the filtering circuit B69 in sequence, with the output of the filtering circuit B69 connected to the multi-frequency modulation signal processing module 48 and the phase difference measurement unit 72, one path of output of the two-path beam-splitting optical fiber B56 is connected with the electro-optical modulator B59, the photoelectric detector C62, the amplifying circuit C66, and the filtering circuit C70 in sequence, with the output of the filtering circuit C70 connected to the phase difference measurement unit 72, and the other path of output of the two-path beam-splitting optical fiber B56 is connected with the photoelectric detector D63, the amplifying circuit D67 and the filtering circuit D71 in sequence, with the output of the filtering circuit D71 wholly connected to the phase difference calibration and compensation unit 74;

the multi-frequency modulation signal processing module 48 includes a crystal oscillator A75, a crystal oscillator B76, a phase locked frequency multiplier A77, a phase locked frequency multiplier B78, an amplifying circuit E79, an amplifying circuit F80, a filtering circuit E81, a filtering circuit F82, a mixer A83, a mixer B84, a power combiner A85, and a power combiner B86; the crystal oscillator A75, the phase locked frequency multiplier A77 and the amplifying circuit E79 are connected in sequence, with the output of the amplifying circuit E79 connected to the electro-optical modulator A58 and the electro-optical modulator B59 in the light signal receiving and processing module 49, the collaboration-terminal light signal receiving and processing module 49 separately has three paths of output, where an output produced by the filtering circuit B69, together with an output produced by sequential connection of the crystal oscillator A75, the phase locked frequency multiplier A77 and the amplifying circuit E79, is input to the mixer B84, an output produced by the mixer B84 is connected with the filtering circuit F82, and an output of the filtering circuit F82 is taken as one path of modulation signals; the filter A68 of the collaboration-terminal light signal receiving and processing module 49 produces two paths of output, where one path of output is directly taken as one path of modulation signals, the other path of output, together with an output produced by sequential connection of the crystal oscillator B76, the phase locked frequency multiplier B78 and the amplifying circuit F80 is input to the mixer A83 and is connected with the filtering circuit E81, an output of the filtering circuit E81 is taken as one path of modulation signals, meanwhile, an output of the amplifying circuit E79 is also taken as one path of modulation signals, the foregoing modulation signals output by the filtering circuit F82 and the amplifying circuit E79 are jointly input to the power combiner A85, modulation signals output by the filtering circuit A68 and the filtering circuit E81 are jointly input to the power combiner B86, and outputs of the power combiner A85 and the power combiner B86 are output to the collaboration-terminal laser modulation module 47, respectively;

the collaboration-terminal laser modulation module 47 includes a laser source 87, a two-path beam-splitting optical fiber D88, an electro-optical modulator C89 and an electro-optical modulator D90; an output of the laser source 87 is connected with the two-path beam-splitting optical fiber D88 to be split into two paths, where one path of output is connected with the electro-optical modulator C89, the other one path of output is connected with the electro-optical modulator D90, outputs of the power combiner A85 and the power combiner B86 in the multi-frequency modulation signal processing module 48 are connected with modulation signal input ports of the electro-optical modulator C89 and the electro-optical modulator D90, respectively, outputs of the electro-optical modulator C89 and the electro-optical modulator D90 are connected with two input ports of the two-path beam-splitting optical fiber A55, respectively, and an output of the two-path beam-splitting optical fiber A55 is connected to the collaboration-terminal light path 29.

The foregoing descriptions are only preferred implementations of the collaborative phase-shift laser ranging device based on differential modulation and demodulation of coarse and precise measuring wavelength and the ranging method thereof, and the scope of the present disclosure is not limited to the foregoing embodiments. All technical solutions based on the idea fall within the protection scope of the present disclosure. It should be noted that those skill in the art can make several improvements and variations without departing from the principles of the present disclosure. These improvements and variations should also be considered as falling within the protection scope of the present disclosure.

What is claimed is:

1. A collaborative phase-shift laser ranging device based on differential modulation and demodulation of coarse and precise measuring wavelength, wherein the device comprises a measuring terminal and a collaboration terminal, the measuring terminal comprising a multi-frequency generating module producing three paths of output, a laser modulation module, a measuring-terminal light path, and a light signal receiving and processing module, wherein two of the three paths of output are input to the laser modulation module for laser modulation, the other one path of output is input to the light signal receiving and processing module, output light from the laser modulation module is input to the measuring-terminal light path, and two paths of output light from the measuring-terminal light path are input to the measuring terminal light signal receiving and processing module as measurement light signals and reference light signals, respectively, for phase detection;

wherein the multi-frequency generating module comprises a first crystal oscillator, a second crystal oscillator, a third crystal oscillator, a first phase locked frequency multiplier, a second phase locked frequency multiplier, a third phase locked frequency multiplier, a fourth phase locked frequency multiplier, a first amplifying circuit, a second amplifying circuit, a third amplifying circuit, a fourth amplifying circuit, a fifth amplifying circuit, a first power combiner and a second power combiner;

an output terminal of the first crystal oscillator is connected to an input terminal of the first phase locked frequency multiplier and passes through the first amplifying circuit; an output signal of the first crystal oscillator is connected to an input terminal of the second phase locked frequency multiplier and passes through the second amplifying circuit, an output terminal of the second crystal oscillator is connected to an input terminal of the third amplifying circuit, and an output signal of the third crystal oscillator is connected to an input terminal of the third phase locked frequency multiplier and passes through the fourth amplifying circuit; an output signal of the third crystal oscillator is connected to an input terminal of the fourth phase locked frequency multiplier and passes through the fifth amplifying circuit; an output terminal of the first amplifying circuit and an output terminal of the fifth amplifying circuit are input to two input terminals of the first power combiner, respectively, an output terminal of the first power combiner is connected to an input terminal of a first electro-optical modulator as a driving signal, an output terminal of the second power combiner is connected to an input terminal of a second electro-optical modulator as a driving signal, and an output terminal of the second amplifying circuit is connected to input terminals of a third electro-optical modulator and a fourth electro-optical modulator as a driving signal.

2. The collaborative phase-shift laser ranging device based on differential modulation and demodulation of coarse and precise measuring wavelength according to claim 1, wherein the laser modulation module comprises a laser source, the first electro-optical modulator, the second electro-optical modulator, a first two-path beam-splitting optical fiber and a second two-path beam-splitting optical fiber; an output of the laser source is connected to the first two-path beam-splitting optical fiber to be split into two paths, an output terminal of one path of the first two-path beam-splitting optical fiber is connected to the input terminal of the first electro-optical modulator, an output terminal of the other path of output is connected to the input terminal of the second electro-optical modulator, output terminals of the first electro-optical modulator and the second electro-optical modulator are connected to two input terminals of the second two-path beam-splitting optical fiber, respectively, and an output terminal of the second two-path beam-splitting optical fiber is connected to an input terminal of a measuring-terminal light path.

3. The collaborative phase-shift laser ranging device based on differential modulation and demodulation of coarse and precise measuring wavelength according to claim 2, wherein the measuring-terminal light path comprises a first collimator, a second collimator, a third collimator, a beam splitter and a beam expander group; the output terminal of the second two-path beam-splitting optical fiber is connected to an input terminal of the first collimator, an output terminal of the first collimator is connected to the beam splitter, one path of output of the beam splitter is connected to an input terminal of the second collimator as reference light, an output terminal of the second collimator is connected to one input terminal of the light signal receiving and processing module, the other path of output of the beam splitter is connected to an input terminal of the beam expander group, an output terminal of the beam expander group is connected to an input of a collaboration-terminal light path, an output of the collaboration-terminal light path is connected to an input terminal of the beam splitter via the beam expander group, an output terminal of the beam splitter is connected to an input terminal of the third collimator as measurement light, and an output terminal of the third collimator is connected to the other input terminal of the light signal receiving and processing module.

4. The collaborative phase-shift laser ranging device based on differential modulation and demodulation of coarse and precise measuring wavelength according to claim 3, wherein the light signal receiving and processing module comprises a third two-path beam-splitting optical fiber, a fourth two-path beam-splitting optical fiber, the third electro-optical modulator, the fourth electro-optical modulator, a first photoelectric detector, a second photoelectric detector, a third photoelectric detector, a fourth photoelectric detector, a sixth amplifying circuit, a seventh amplifying circuit, an eighth amplifying circuit, a ninth amplifying circuit, a first filtering circuit, a second filtering circuit, a third filtering circuit, a fourth filtering circuit and a high-precision phase-detection board card; one output terminal of the measuring-terminal light path is split into two paths after being connected with an input terminal of the third two-path beam-splitting optical fiber as reference light, one output terminal of the third two-path beam-splitting optical fiber is connected to an input terminal of the third electro-optical modulator, the input terminal of the third electro-optical modulator is connected to an input terminal of the first photoelectric detector, an output terminal of the first photoelectric detector, the sixth amplifying circuit and the first filtering circuit are connected in sequence, an output terminal of the first filtering circuit is connected to the high-precision phase-detection board card, and the other output terminal of the third two-path beam-splitting optical fiber, upon connection to an input terminal of the second photoelectric detector, is connected to the high-precision phase-detection board card after passing through the seventh amplifying circuit and the second filtering circuit in sequence;

the other output terminal of the measuring-terminal light path is connected with an input terminal of the fourth two-path beam-splitting optical fiber as measurement light and is split into two paths, an output terminal of one path of the fourth two-path beam-splitting optical fiber is connected to an input terminal of the fourth electro-optical modulator, an output terminal of the fourth electro-optical modulator, the third photoelectric detector, the eighth amplifying circuit and the third filtering circuit are connected in sequence, and an output terminal of the third filtering circuit is connected to the high-precision phase-detection board card; an output terminal of the other path of the fourth two-path beam-splitting optical fiber is connected to an input terminal of the fourth photoelectric detector, and is connected to the high-precision phase-detection board card though the ninth amplifying circuit and the fourth filtering circuit in sequence.

5. The collaborative phase-shift laser ranging device based on differential modulation and demodulation of coarse and precise measuring wavelength according to claim 4, wherein:

the collaboration terminal is located at a measured target and comprises a collaboration-terminal light path, a collaboration-terminal laser modulation module, a multi-frequency modulation signal processing module and a collaboration-terminal light signal receiving and processing module; the collaboration-terminal light path receives measurement signals from the measuring terminal, an output of the collaboration-terminal active laser modulation module is connected to an input of the collaboration-terminal light path, two paths of output of the collaboration-terminal light path are connected to the collaboration-terminal light signal receiving and processing module, the collaboration-terminal light signal receiving and processing module produces three paths of output which are connected to the multi-frequency modulation signal processing module as an input, and the multi-frequency modulation signal processing module produces three paths of output, wherein two paths are input to the collaboration-terminal laser modulation module, and the other path of output is input to the collaboration-terminal light signal receiving and processing module.

6. A collaborative phase-shift laser ranging method based on differential modulation and demodulation of coarse and precise measuring wavelength, the method being implemented according to the collaborative phase-shift laser ranging device based on differential modulation and demodulation of coarse and precise measuring wavelength according to claim 5, wherein the method comprises the following steps:

step 1, generating, by the multi-frequency generating module of the measuring terminal, sinusoidal signals with frequencies of $v_1$, $v_1-f_1$, $v_2$, $v_3$ and $v_3+f$, modulating the intensity of a laser beam output from the laser source by means of electro-optic intensity modulation to produce light signals with frequencies of $v_1$, $v_2$, $v_3$ and $v_3+f$, and splitting the light beam into two beams, with one beam emitted to a target to be measured as measurement light, and the other beam used as a reference signal of the measuring terminal; wherein the frequency of a precision gauge is $v_1$, the frequency of a secondary precision gauge is $v_2$, and the frequency of a coarseness gauge is f;

step 2, placing the ranging collaboration terminal at the target to be measured, producing sinusoidal electric signals $X(v_1-f_1, \varphi_{v_10})$, $X(v_3, \varphi_{v_30})$, receiving at the collaboration terminal measurement signals from the measuring terminal, which are then split into two parts, conducting secondary modulation on one part of light beams by the electro-optical intensity modulators, producing difference frequency signals with the frequency of $f_1$ from precision gauge signals under the modulation of sinusoidal waves with the frequency of $v_1-f_1$ at the collaboration terminal, the phase $\varphi_{v1}'$ of the difference frequency signals possessing ranging phase information of the precision gauge $v_1$, and producing difference frequency electric signals $Y(f_1, \varphi_{v1}'-\varphi_{v_10})$ with the frequency of $f_1$ upon conversion and separation by using the photoelectric detectors and filters; detecting a difference frequency signal f of $v_3$ and $v_3+f$ in the other part of measurement light beams by the photoelectric detectors as the coarseness gauge, taking a phase $\varphi_f'$ of the difference frequency signal f as a coarseness result, and upon conversion and separation by using the photoelectric detectors and filters, obtaining electric signals $Y(v_2, \varphi_{v2}')$ and $Y(f, \varphi_f')$ of the secondary precision gauge $v_2$ and the coarseness gauge f respectively;

step 3, using the extracted electric signals with phase information as modulation signals to modulate intensity of output light of the collaboration-terminal laser source; mixing the electric signals $Y(f_1, \varphi_{v1}'-\varphi_{v_10})$ with the ranging phase information of the precision gauge with the signals $X(v_1-f_1, \varphi_{v_10})$ with the frequency $v_1-f_1$ of the collaboration terminal to restore the precision gauge $v_1$ with precision phase information; mixing the coarseness gauge $Y(f, \varphi_f')$ with electric signals $X(v_3, \varphi_{v_30})$ with the frequency of $v_3$ produced by the collaboration terminal to obtain electric signals with the frequency of $v_3+f$; and using the foregoing electric signals with frequencies of $v_1$, $v_2$, $v_3$ and $v_3+f$ to modulate laser beams output from the collaboration terminal by means of intensity modulation;

step 4, taking laser at the collaboration terminal upon modulation as measurement return light of a target terminal, splitting the laser into two beams, with one beam transmitted back to the measuring terminal, and the other beam used as a reference signal at the collaboration terminal, and input to the light signal receiving and processing module of the collaboration terminal for measurement and compensation of additional phase retardation at the collaboration terminal; firstly, conducting modulation via the electro-optical modulators, producing difference frequency signals $Y(f_1, \varphi_{v1}''-\varphi_{v_10})$ with the frequency of $f_1$ and phase information of the precision gauge $v_1$ in return light under the modulation of signals $X(v_1-f_1, \varphi_{v_10})$ with the frequency of $v_1-f_1$ at the collaboration terminal, then conducting phase difference measurement on difference frequency signals, together with electric signals $Y(f_1, \varphi_{v1}'-\varphi_{v_10})$ with the frequency of $f_1$ as processed in the measurement return laser, sending $\Delta\varphi_{v_1}$ to the measuring terminal in real time through a laser communication module, and carrying out real-time compensation at the measuring terminal, wherein the measured phase difference $\Delta\varphi_{v_1}=\varphi_{v_1}''-\varphi_{v_1}'$ is the additional phase value of the precision gauge produced by the collaboration terminal, which varies with the change of environmental parameters of the collaboration terminal, and exerts a great influence on the ranging accuracy; on the other hand, given that the additional phase value drift of the coarseness gauge/and the secondary precision gauge $v_2$ at the collaboration terminal exhibits no effect on the ranging accuracy, calibrating the additional phase value in advance by a phase difference calibration and compensation unit, and introducing fixed compensation phase values $\Delta\varphi_{v_2}$, $\Delta\varphi_f$ of the corresponding gauges into the measuring terminal;

step 5, receiving the measurement return light at the measuring terminal, demodulating reference signals at the measuring terminal and one part of light in measurement return light signals by means of secondary electro-optical intensity modulation, respectively, and under the modulation of electric signals with the frequency of $v_1-f_1$ at the measuring terminal, producing difference frequency signals with the frequency of $f_1$ and phase information of the precision gauge $v_1$, which are then converted into electric signals by the photoelectric detectors; converting the reference signals at the measuring terminal and the other part of light in the measurement return light signals into electric signals by using the photoelectric detectors, separating out electric signals with the frequencies of $v_2$ and f by the filters, and taking the electric signals as the difference frequency signals between the reference light signals and the light signals with the frequencies of $v_3$ and $v_3+f$ in the measurement return light, wherein f denotes the frequency of the coarseness gauge, and the phase of the difference frequency signals denotes the ranging result of the coarseness gauge; measuring the phase differences between the reference electric signals with frequencies of $f_1$, $v_2$, and f and electric signals of the measurement return light as $\varphi_{v_1}$, $\varphi_{v_2}$ and $\varphi_f$, respectively, and obtaining ranging results of $\varphi_{v_1}-\Delta\varphi_{v_1}$, $\varphi_{v_2}-\Delta\varphi_{v_2}$ and $\varphi_f-\Delta\varphi_f$ and from the multiple gauges; and step 6, using a data synthesis unit of the high-precision phase-detection board card to synthesize three phase differences and generate a distance value, wherein the coarseness gauge has a frequency of f, and a wavelength of $\lambda$ and the distance measurement value of the coarseness gauge is expressed by the following equation:

$$D_{coa1} = \frac{\lambda(\varphi_f - \Delta\varphi_f)}{4\pi}$$

signals with a frequency of $v_2$ denote the secondary coarseness gauge which has a wavelength of $\lambda_2$, and the distance measurement value of the secondary coarseness gauge is expressed by the following equation:

$$D_{coa2} = \frac{\lambda_2}{2}\left[\text{floor}\left(\frac{2D_{coa}}{\lambda_2} - \frac{\varphi_{v_2} - \Delta\varphi_{v_2}}{2n\pi} + \frac{1}{2}\right) + \frac{\varphi_{v_2} - \Delta\varphi_{v_2}}{2n\pi}\right];$$

signals with a frequency of $v_1$ denote the precision gauge which has a wavelength of $\lambda_1$, and the measured distance is expressed by the following equation:

$$D = \frac{\lambda_1}{2}\left[\text{floor}\left(\frac{2D_{coa2}}{\lambda_1} - \frac{\varphi_{v_1} - \Delta\varphi_{v_1}}{2n\pi} + \frac{1}{2}\right) + \frac{\varphi_{v_1} - \Delta\varphi_{v_1}}{2n\pi}\right]$$

wherein floor ( ) function is a rounding function.

* * * * *